US012774849B2

(12) United States Patent
Beaufrere

(10) Patent No.: US 12,774,849 B2
(45) Date of Patent: Oct. 27, 2026

(54) POWER SUPPLY MANAGEMENT IN A TRANSPORT REFRIGERATION UNIT

(71) Applicant: Carrier Corporation, Palm Beach Gardens, FL (US)

(72) Inventor: Florian Beaufrere, Rouen (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 19/069,572

(22) Filed: Mar. 4, 2025

(65) Prior Publication Data

US 2025/0283658 A1 Sep. 11, 2025

Related U.S. Application Data

(60) Provisional application No. 63/561,586, filed on Mar. 5, 2024.

(51) Int. Cl.
*F25D 29/00* (2006.01)
*B60P 3/20* (2006.01)
(Continued)

(52) U.S. Cl.
CPC .............. *F25D 29/003* (2013.01); *B60P 3/20* (2013.01); *H01M 10/425* (2013.01); (Continued)

(58) Field of Classification Search
CPC ....... F25D 29/003; B60P 3/20; H01M 10/425; H01M 10/44; H01M 2010/4271;
(Continued)

(56) References Cited

U.S. PATENT DOCUMENTS

| | | | |
|---|---|---|---|
| 8,004,242 | B1 | 8/2011 | Purkey et al. |
| 9,168,836 | B2 | 10/2015 | Jacobsen |
| 11,192,451 | B2 | 12/2021 | Schumacher et al. |
| 11,277,003 | B2 | 3/2022 | Marcinkiewicz |

(Continued)

FOREIGN PATENT DOCUMENTS

| | | | |
|---|---|---|---|
| EP | 3667207 | A1 | 6/2020 |
| EP | 3756914 | A1 | 12/2020 |

(Continued)

OTHER PUBLICATIONS

Extended European Search Report received for EP Application No. 25158948.7, mailed on Sep. 29, 2025, 10 Pages.

*Primary Examiner* — Rodney A Butler
(74) *Attorney, Agent, or Firm* — Souad Hakim

(57) ABSTRACT

Disclosed herein is a power supply system for a transport refrigeration unit (TRU). The power supply system comprises a battery having a battery management system (BMS). The BMS configured to enable a supply of electrical power to the battery or a supply of electrical power from the battery to the TRU, a generator electrically connected to the battery and the TRU, and a controller connected to the TRU, the generator, and the BMS, wherein the controller comprises a processor with access to a memory storing instructions executable by the processor, which causes the controller to monitor electrical power consumption of the TRU; monitor electrical power generated by the generator, and enable the supply of electrical power from the generator to the battery and/or powering the TRU based on the electrical power consumption of the TRU and the electrical power generated by the generator.

20 Claims, 5 Drawing Sheets

(51) Int. Cl.

| | |
|---|---|
| ***H01M 10/42*** | (2006.01) |
| ***H01M 10/44*** | (2006.01) |
| ***H02J 7/00*** | (2006.01) |
| ***H02J 7/14*** | (2006.01) |
| *B60R 16/033* | (2006.01) |

(52) U.S. Cl.

CPC ........... *H01M 10/44* (2013.01); *H02J 7/1469* (2013.01); *H02J 7/865* (2026.01); *B60R 16/033* (2013.01); *H01M 2010/4271* (2013.01); *H01M 2220/20* (2013.01)

(58) Field of Classification Search

CPC .... H01M 2220/20; H02J 7/1469; H02J 7/865; H02J 7/1415; B60R 16/033; B60R 16/03; B60R 16/0307; B60H 1/00428; B60H 1/00014; B60H 1/3232; B60H 1/32; F25B 27/00; B60L 1/02

See application file for complete search history.

(56) References Cited

U.S. PATENT DOCUMENTS

| | | | | |
|---|---|---|---|---|
| 11,863,008 | B2 | 1/2024 | Stoltz et al. | |
| 2017/0282714 | A1* | 10/2017 | Schumacher ...... | B60H 1/00428 |
| 2018/0152044 | A1 | 5/2018 | Srnec et al. | |
| 2019/0255906 | A1 | 8/2019 | Poolman et al. | |
| 2021/0129700 | A1 | 5/2021 | Song | |
| 2021/0213806 | A1 | 7/2021 | Saroka et al. | |
| 2021/0252947 | A1 | 8/2021 | She et al. | |
| 2021/0268865 | A1 | 9/2021 | Saroka et al. | |
| 2023/0318347 | A1 | 10/2023 | Hashizume et al. | |
| 2024/0059235 | A1 | 2/2024 | Augenstein et al. | |

FOREIGN PATENT DOCUMENTS

| | | | |
|---|---|---|---|
| GB | 2174558 | A | 11/1986 |
| JP | 4687704 | B2 | 5/2011 |
| KR | 10-0794182 | B1 | 1/2008 |
| KR | 10-2192654 | B1 | 12/2020 |

* cited by examiner

POWER SUPPLY MANAGEMENT IN A TRANSPORT REFRIGERATION UNIT

CROSS-REFERENCE TO RELATED APPLICATION

This patent application claims the benefit of U.S. Provisional Patent Application No. 63/561,586, filed on Mar. 5, 2024, which is incorporated by reference herein in its entirety.

BACKGROUND

The subject disclosure relates to transport refrigeration units and power supply management systems, and more particularly, to a system, method, and controller for power supply management in a transport refrigeration unit (TRU).

SUMMARY

Disclosed herein is a power supply system for a transport refrigeration unit (TRU). The power supply system comprises a battery having a battery management system (BMS), the BMS configured to selectively enable a supply of electrical power to the battery or a supply of electrical power from the battery to the TRU, wherein the generator is configured to generate electrical power based on, at least in part, a dedicated engine of the TRU, and wherein the electrical power is distributed either to the TRU, or the battery, or simultaneously to the TRU and the battery. The power supply system also comprises a generator electrically connected to the battery and the TRU, and a controller connected to the TRU, the generator, and the BMS, wherein the controller comprises a processor with access to a memory storing instructions executable by the processor, which causes the controller to monitor electrical power consumption of the TRU, monitor electrical power generated by the generator, and transmit a control signal to the BMS to supply the electrical power from the generator to the battery and/or power the TRU based on the electrical power consumption of the TRU and the electrical power generated by the generator.

In one or more embodiments, the power supply system comprises a first set of sensors to monitor the electrical power consumed by one or more components of the TRU in real-time, and a second set of sensors to monitor the electrical power generated by the generator.

In one or more embodiments, the controller comprises a charging operation mode in which the controller is configured to actuate one or more switches associated with the BMS to supply electrical power from the generator to the battery upon detecting the electrical power generated by the generator to be more than the electrical power consumption of the TRU.

In one or more embodiments, the controller is configured to control the BMS based on the electrical power generated by the generator, the electrical power consumption of the TRU, and a state of charge (SoC) of the battery.

In one or more embodiments, the electrical power supplied by the generator is determined based on a difference between the electrical power consumption of the TRU and the SoC of the battery.

In one or more embodiments, upon detecting the electrical power generated by the generator to be less than the electrical power consumption of the TRU, the controller operates in a power supply mode in which the controller actuates one or more switches associated with the BMS to enable the supply of the electrical power from the battery to the TRU.

In one or more embodiments, upon detecting the battery to be charged above a threshold level and the electrical power generated by the generator to be more than the electrical power consumption of the TRU, the controller is configured to operate in a power export mode in which the controller actuates one or more switches associated with the BMS to supply electrical power from the battery to an external power source, while simultaneously recharging the battery via the generator to keep the battery at the threshold level.

In one or more embodiments, the dedicated engine is a combustion engine that is operable to drive the generator to generate electrical power, wherein the dedicated engine is associated with the TRU or a container equipped with the TRU.

In one or more embodiments, the system comprises one or more human-machine interfaces (HMI) in communication with the controller. The controller allows one or more users to change between the charging operation mode, the power supply mode, and the power export mode, and monitor one or more of the real-time electrical power consumption of the TRU, the electrical power generated by the generator, the SoC of the battery, and the electrical power supplied by the generator to the battery.

Also described herein is a controller for a TRU. The controller being connected to the TRU, a battery, a generator, and a BMS of the battery. The controller comprises a processor coupled to a memory storing instructions executable by the processor, which causes the controller to monitor electrical power consumption of the TRU, monitor electrical power generated by the generator, wherein the generator is configured to generate electrical power based on, at least in part, a dedicated engine of the TRU, and wherein the electrical power is distributed either to the TRU, or the battery, or simultaneously to the TRU and the battery, and transmit a control signal to supply electrical power from the generator to the battery and/or power the TRU based on the electrical power consumption of the TRU and the electrical power generated by the generator.

In one or more embodiments, the controller comprises a first set of sensors to monitor the electrical power consumed by one or more components of the TRU in real-time, and a second set of sensors to monitor the electrical power generated by the generator.

In one or more embodiments, the controller comprises a charging operation mode in which the controller is configured to actuate one or more switches associated with the BMS to supply the electrical power from the generator to the battery upon detecting the electrical power generated by the generator to be more than the electrical power consumption of the TRU.

In one or more embodiments, the controller is configured to control the BMS based on the electrical power generated by the generator, the electrical power consumption of the TRU, and a state of charge (SoC) of the battery, wherein the electrical power supplied by the generator is determined based on a difference between the electrical power consumption of the TRU and the SoC of the battery.

In one or more embodiments, upon detecting the electrical power generated by the generator to be less than the electrical power consumption of the TRU, the controller is configured to operate in a power supply mode in which the controller actuates one or more switches associated with the BMS to supply the electrical power from the battery to the TRU.

In one or more embodiments, upon detecting the battery to be charged above a threshold level and the electrical power generated by the generator to be more than the electrical power consumption of the TRU, the controller is configured to operate in a power export mode in which the controller actuates one or more switches associated with the BMS to supply the electrical power from the battery to an external power source, while simultaneously recharging the battery via the generator to keep the battery at the threshold level.

In one or more embodiments, the dedicated engine is a combustion engine that is operable to drive the generator to generate electrical power, wherein the dedicated engine is associated with the TRU or a container equipped with the TRU.

In one or more embodiments, the controller comprises a communication module operatively coupled to the controller, which enables the controller to establish a secured communication between the controller and one or more human-machine interface (HMI) associated with one or more users, wherein the controller allows one or more users to change between the charging operation mode, the power supply mode, and the power export mode, and monitor one or more of the real-time electrical power consumption of the TRU, the electrical power generated by the generator, the SoC of the battery, and the electrical power supplied by the generator to the battery.

Further described herein is a method for power supply management in a TRU. The method comprises monitoring, by a controller, electrical power consumption of the TRU, monitoring, by the controller, electrical power generated by a generator that is connected to a battery and the TRU, wherein the generator is configured to generate electrical power based on, at least in part, a dedicated engine of the TRU, and wherein the electrical power is distributed either to the TRU, or the battery, or simultaneously to the TRU and the battery, and transmitting a control signals to a BMS to supply electrical power from the generator to the battery and/or powering the TRU based on the electrical power consumption of the TRU and the electrical power generated by the generator.

In one or more embodiments, when the electrical power generated by the generator is more than the electrical power consumption of the TRU, the method comprises the steps of transmitting the control signals to the BMS associated with the battery to supply the electrical power from the generator to the battery.

In one or more embodiments, the electrical power supplied by the generator is determined based on the electrical power generated by the generator, the electrical power consumption of the TRU, and a state of charge (SoC) of the battery.

In one or more embodiments, when the electrical power generated by the generator is less than the electrical power consumption of the TRU, the method comprises the steps of transmitting the control signals to the BMS associated with the battery to supply the electrical power stored in the battery to the TRU.

The foregoing summary is illustrative only and is not intended to be in any way limiting. In addition to the illustrative aspects, embodiments, and features described above, further aspects, embodiments, features, and techniques of the subject disclosure will become more apparent from the following description taken in conjunction with the drawings.

BRIEF DESCRIPTION OF THE DRAWINGS

The accompanying drawings are included to provide a further understanding of the subject disclosure and are incorporated in and constitute a part of this specification. The drawings illustrate exemplary embodiments of the subject disclosure and, together with the description, serve to explain the principles of the subject disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
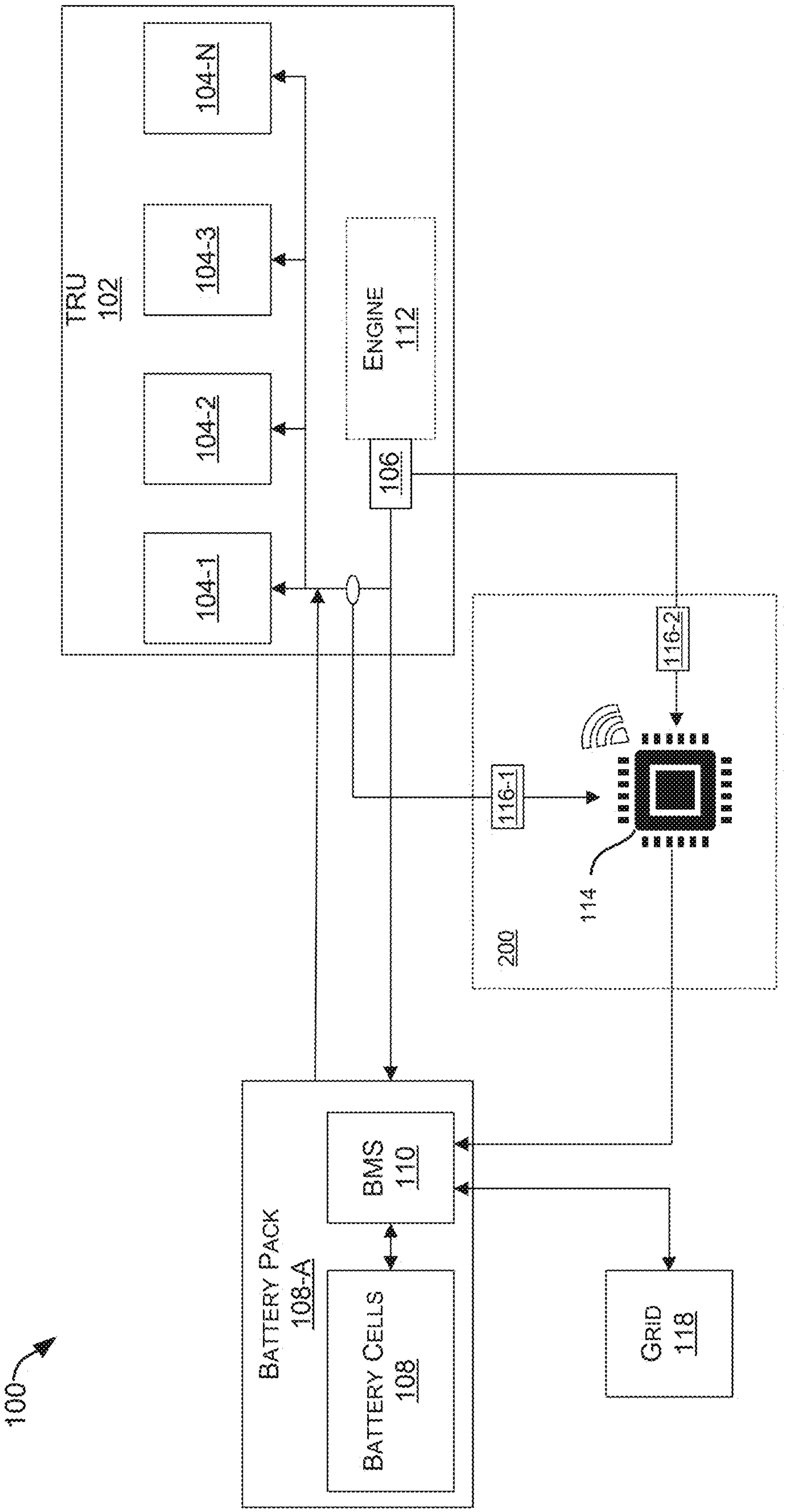
FIGS. 1A and 1B illustrate exemplary representations of the power supply system for a transport refrigeration unit (TRU), in accordance with one or more embodiments of the subject disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the subject disclosure as defined by the appended claims.

Various terms are used herein. To the extent a term used in a claim is not defined below, it should be given the broadest definition persons in the pertinent art have given that term as reflected in printed publications and issued patents at the time of filing.

In the specification, reference may be made to the spatial relationships between various components and to the spatial orientation of various aspects of components as the devices are depicted in the attached drawings. However, as will be recognized by those skilled in the art after a complete reading of the subject disclosure, the components of the subject disclosure. described herein may be positioned in any desired orientation. Thus, the use of terms such as "above," "below," "upper," "lower," "first," "second," or other like terms to describe a spatial relationship between various components or to describe the spatial orientation of aspects of such components should be understood to describe a relative relationship between the components or a spatial orientation of aspects of such components.

Transport refrigeration units (TRUs), commonly known as reefer units, are essential for allowing for the safe and efficient transport of perishable goods over long distances. These units may be battery-powered or generator-powered to generate the power needed for refrigeration. An important aspect of these systems is ensuring a consistent and reliable power source, not only for the refrigeration process but also for the auxiliary systems that support the unit's operation, including the battery system that powers electronic controls, safety systems, and other essential components.

Existing generator-powered reefer units operate in a relatively straightforward manner, with the generator powering the refrigeration unit or powering the battery. The generator may be an axle generator; however, a diesel engine may also power the generator that, in turn, provides the electricity needed to run the refrigeration mechanism. However, this setup has been identified as inefficient in terms of energy use. Specifically, it has been observed that when the generator powers the refrigeration unit, there is often surplus energy produced. This surplus arises because the generator's load does not always match its maximum output capacity, leading to inefficient energy utilization. This inefficiency presents an opportunity for innovation in how this excess energy available at the generator is managed and used.

Furthermore, existing systems face limitations in their operational flexibility, particularly concerning the recharging of the unit's battery. The existing setup allows for the battery to be charged by the generator, but not concurrently with the operation of the refrigeration unit. This limitation necessitates a choice between running the refrigeration unit or charging the battery, but not both simultaneously, which can lead to operational inefficiencies and challenges in managing the unit's power resources, especially during long hauls where both refrigeration and battery support are important.

Existing solutions attempting to address these inefficiencies have primarily focused on enhancing the refrigeration unit's performance. However, these solutions have not fully addressed the issue of surplus energy generation and its potential uses, particularly regarding battery recharging. Moreover, the inability to simultaneously run the refrigeration unit and recharge the battery represents a significant gap in the optimization of TRUs' operational capabilities.

The subject disclosure overcomes the above-mentioned shortcomings and limitations associated with the existing reefer units/TRUs and associated power supply management, by providing an improved, cost-effective, and efficient solution that optimizes the electrical power use in generator-powered reefer units/TRU, ensuring that the energy generated by the generator is effectively utilized for battery recharging without compromising the operation of the refrigeration unit.

The TRU of the subject disclosure may be installed on a container or trailer associated with a vehicle. The TRU may be configured to maintain a conditioned environment in an enclosed (storage or conservation) space within the container/trailer. Various products including, but not limited to, pharmaceutical and nutraceutical products, and perishable items such as foods and beverages, and the like, may be stored and transported in the container/trailer.

The TRU may maintain the environment of the storage space at a specific or user-defined temperature and/or humidity, based on the stored products, to keep the stored products in a healthy condition while transporting and comply with product compliance regulations.

The TRU may be installed on the container/trailer associated with a vehicle, which may be any of including, but not limited to, an electric truck, a semi-electric truck, and a non-electric truck, such that the TRU remains fluidically connected to the ambient and further remains fluidically connected to the storage space of the container/trailer. Accordingly, based on the environment to be maintained in the storage space or based on the products to be transported, the TRU may be operated to adjust its cooling capacity and supply conditioned air within the storage space.

Figure 1B:
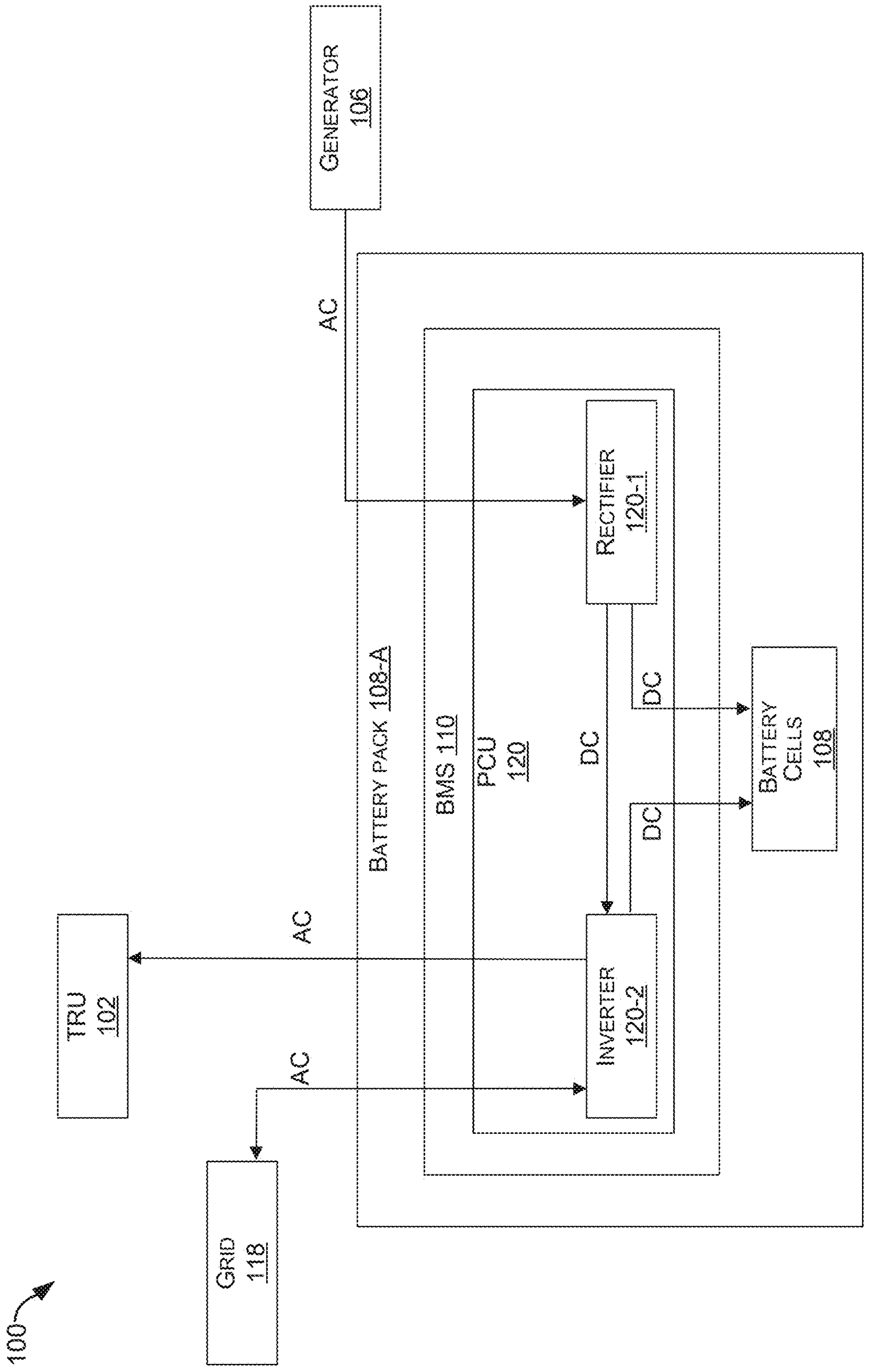

Referring to FIGS. 1A and 1B, a power supply system 100 (also referred to as a system 100, herein) for the TRU 102 is disclosed. The system 100 or TRU 102 may include an electrical generator 106, and a battery 108 configured with a battery management system (BMS) 110. In one or more embodiments, the system 100 may include an existing battery 108 and the BMS 110 associated with the vehicle or TRU 102. However, in other embodiments, the battery 108 and BMS 110 may also be additionally installed on the TRU 102 or vehicle associated with the TRU 102. The generator 106 may be electrically connected to the battery 108 and the TRU 102. Further, the BMS 110 may be configured to supply electrical energy/power generated by the generator 106 to the battery 108 and/or power the TRU 102 using the electrical energy/power stored in the battery 108. In some embodiments, the generator 106 may be configured to generate electrical power, partially or entirely, based on a dedicated engine of the TRU 102. Further, the electrical power generated by the generator 106 may be distributed either to the TRU 102, or the battery 108, or simultaneously to the TRU 102 and the battery 108.

In one or more embodiments, the generator 106 may be an axle generator that may be connected to an axle or hub of the vehicle or container associated with the TRU 102. The axle generator 106 may be configured to generate electrical power upon rotation of the vehicle wheels or movement of the vehicle or container. Further, in one or more embodiments, the generator 106 may be connected to a dedicated engine 112 of the TRU 102. In some embodiments, the dedicated engine may be a combustion engine. The combustion engine may be a fuel-powered engine or diesel-powered engine, but is not limited to the like, that may be configured to drive the generator 106 and correspondingly generate electrical power.

The battery 108 may be electrically connected to the generator 106 via the BMS 110. In addition, the battery 108 may also be configured to be electrically connected to an external electrical power source such as, but not limited to, an electrical grid 118. The BMS 110 may be configured to control the charging of the battery 108 via the generator 106 or the grid, and further enable the supply of electrical power from the battery 108 to the components 104 of the TRU 102 or vehicle. Further, the battery 108 and the generator 106 may be electrically coupled to the components 104-1 to 104-N (collectively designated as 104, herein) of the TRU 102. In one or more embodiments, the components 104-1 to 104-N of the TRU 102 may include, but are not limited to, a compressor, a condenser fan, an evaporator fan, and an electric heater.

Figure 2:
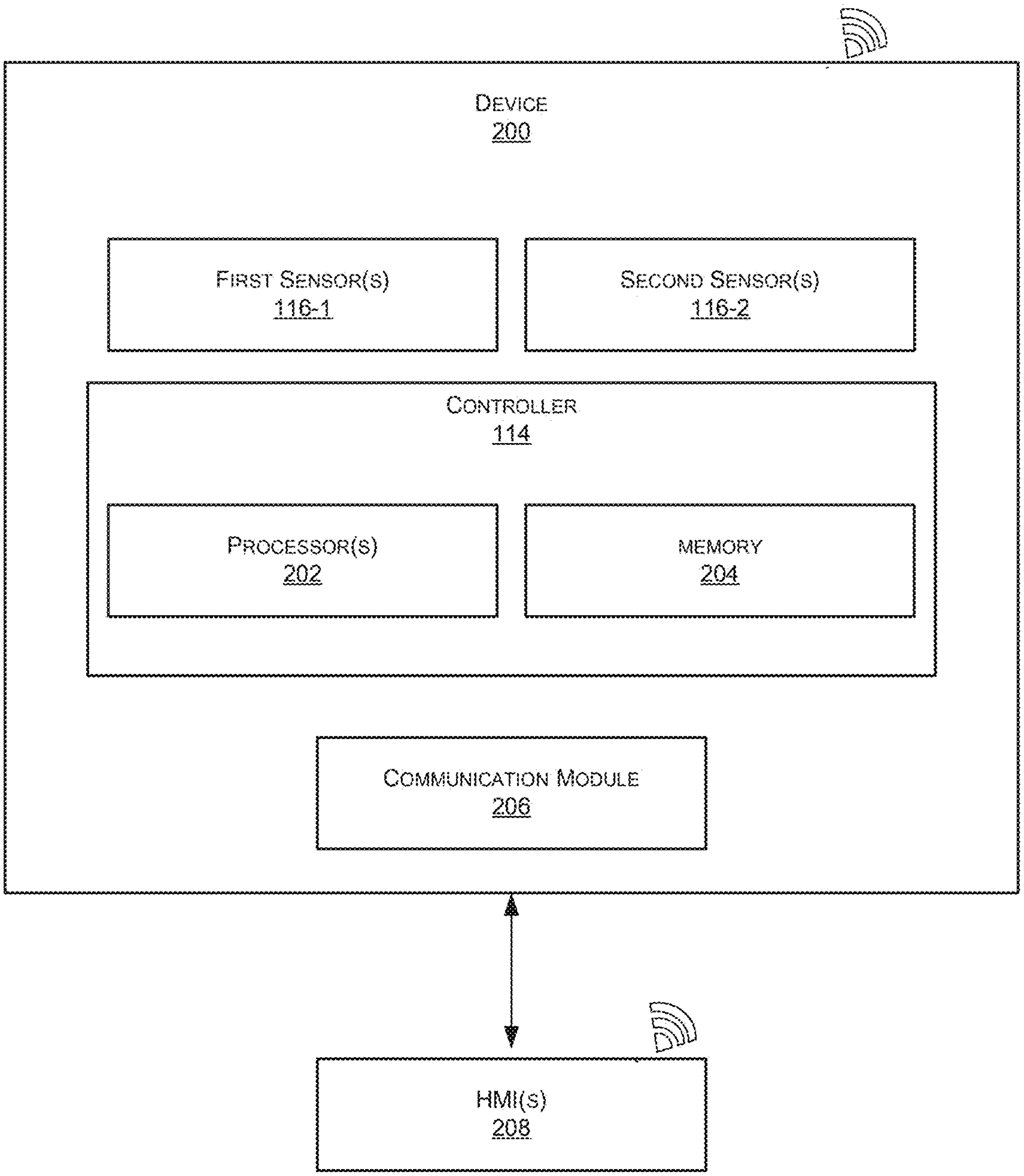
FIG. 2 illustrates an exemplary block diagram depicting functional modules of the controller of the TRU, in accordance with one or more embodiments of the subject disclosure.

In one or more embodiments, the system 100 may include a controller 114 configured to be connected to the generator 106, the battery 108, the BMS 110, and the components 104 of the TRU 102. In one or more embodiments, the controller 114 may be in the form of a device 200 (as shown in FIG. 2) that may be retrofitted to existing TRUs 102. Referring to FIGS. 1A and 2, the device 200 may further include a first set of sensors 116-1 to monitor the electrical power consumed by the components 104 or the TRU 102 in real-time. Further, the device 200 may include a second set of sensors 116-2 to monitor the electrical power generated by the generator 106. In one or more embodiments, the first and second set of sensors may include a current sensor, a voltage sensor, a watt meter, an energy meter, and a frequency and phase meter, but are not limited to the like.

The controller 114 may be in communication with the first and second set of sensors 116-1, 116-2 and further operatively connected to the generator 106, the BMS 110, and the components 104 of the battery 108. The controller 114 may include a processor 202 coupled to a memory 204 storing instructions executable by the processor 202, which causes the controller 114 to perform one or more designated operations. In one or more embodiments, the controller 114 may be configured to monitor, using the first sensors 116-1, the electrical power consumption of the TRU 102 and further monitor, using the second sensors 116-2, the electrical power generated by the generator 106. Accordingly, the controller 114 may enable the supply of electrical power from the generator 106 to the battery 108 and/or power the TRU 102 based on the electrical power consumption of the TRU 102 and the electrical power generated by the generator 106.

In one or more embodiments, the controller 114 may operate in a charging operation mode in which the controller 114 may actuate one or more switches (not shown) associated with the BMS 110 to enable the supply of electrical power from the generator 106 to the battery 108 upon detecting the electrical power generated by the generator 106 to be more than the electrical power consumption of the TRU 102. In one or more embodiments, the switches may be internal power-electronic switches associated with a power conversion unit 120 of the BMS 110. However, the switches may also be external switches configured in electrical lines connecting the BMS 110 to the generator 106, the TRU 102, and the battery 108. The detailed construction of a power conversion unit (PCU) 120 of the BMS 110 has been described later in conjunction with FIG. 1B.

In one or more embodiments, in the charging operation mode, the controller 114 may actuate the BMS 110 to enable the supply of electrical power from the generator 106 to the battery 108 while providing electrical power to the TRU 102 based on its power consumption. As a result, the surplus electrical power available at the generator 106 may be efficiently utilized to charge the battery 108. Thus, the system 100 allows for the battery 108 to be charged by the generator 106/engine 112, while concurrently/simultaneously providing electrical power to the TRU 102 for uninterrupted operation of thereof.

In one or more embodiments, in the charging operation mode, the controller 114 may control the BMS 110 based on the electrical power generated by the generator 106, the electrical power consumption of the TRU 102, and a state of charge (SoC) of the battery 108. Further, the electrical power supplied by the generator 106 may be determined based on a difference between the electrical power consumption of the TRU 102 and the SoC of the battery 108. This may prevent overcharging or overheating of the battery 108 while charging.

In addition, in one or more embodiments, upon detecting the battery 108 to be fully charged or charged above a threshold level and the electrical power generated by the generator 106 to be more than the electrical power consumption of the TRU 102, the controller 114 may operate in a power export mode where the controller 114 may actuate the BMS 110 to enable supply of electrical power from the battery 108 to the grid (external power source) 118, while simultaneously recharging the battery 108 via the generator 106 to keep the battery 108 at the threshold level.

Further, in one or more embodiments, upon detecting the electrical power generated by the generator 106 to be less than the electrical power consumption of the TRU 102, the controller 114 may operate in a power supply mode where the controller 114 may actuate the switches associated with BMS 110 to enable the supply of the electrical power stored in the battery 108 to the components 104 of the TRU 102. This may improve the reliability of the system 100, especially when the generator 106 is inactive or under a fault or maintenance, as the TRU 102 can efficiently and uninterruptedly receive electrical power from the battery 108 in such situations.

In one or more embodiments, the system 100 or device 200 may include one or more human-machine interfaces (HMI) (208 as shown in FIG. 2) in communication with the controller 114. The controller 114 may allow one or more registered users to change between the charging operation mode, the power supply mode, and the power export mode, and further set the predefined charging level or threshold (charging) level for the battery 108. The HMIs 208 may further allow the users to monitor one or more of the real-time electrical power consumption of the TRU 102, the electrical power generated by the generator 106, the state of charge (SoC) or electrical power stored or available in the battery 108, the electrical power supplied by the generator 106 to the battery 108, and the operating mode of the device 200. In one or more embodiments, the HMI may be installed in a cabin of the vehicle and/or within the container/trailer. Further, in some embodiments, the HMI 208 may also be a mobile phone or other portable computing device 200 associated with the users, but are not limited to the like.

In one or more embodiments, the device 200 may include a communication module 206 operatively coupled to the controller 114, which may enable the device 200 to establish a secured communication with the sensors, the BMS 110, the HMI 208, and various other components 104 associated with the TRU 102 and vehicle. The communication module 206 may be wired media and/or wireless media. For instance, the communication module may be a transceiver but not limited to the like, that may include but is not limited to, an antenna, an Ethernet port, a universal serial bus (USB) port, or any other port that can be configured to receive and transmit location and attributes data. Further, in one or more embodiments, the communication module 206 may include ethernet modules, Wi-Fi modules, Bluetooth modules, Zigbee modules, GSM/GPRS modules, LoRa modules, 5G modules, RS-232/RS-485 serial communication modules, Controller Area Network (CAN) modules, but not limited to the like.

Referring to FIGS. 1A and 1B, in one or more embodiments, the battery 108 and the BMS 110 may be packaged as a battery pack 108-A. The battery 108 pack may include one or more battery cell modules (also referred to as battery cells 108, herein), and the PCU 120 to convert electrical power received and/or supplied by the battery 108 in a range suitable for the battery cells 108, the TRU 102, and the grid (external power sources) 118. The battery 108 pack may further include one or more interfaces to facilitate the connection of the battery 108 pack with the TRU 102, the generator 106, the controller 114, and the grid 118.

In one or more embodiments, the PCU 120 within the battery pack 108-A or BMS 110 may facilitate in managing and converting electrical power to ensure optimal performance, efficiency, and compatibility with connected loads (TRU) or charging sources (generator 106 or external power source 118). The PCU 120 may include one or more rectifiers 120-1, one or more inverters 120-2, and/or one or more direct current (DC)-DC converters (not shown). The rectifier(s) 120-1 may be configured to convert the alternating current (AC) power supplied by the generator 106 or external power sources 118 into DC power for the battery cells 108. Further, the inverters 120-2 may be configured to convert the DC power level output by the battery cells 108 into AC power for the AC power-based components 104 of the TRU 102 during the charging operation mode or power supply mode and/or to the grid 118 during the power export mode. Furthermore, the DC-DC converter may be configured to adjust the DC power level output by the battery cells 108 to match the input DC level for the DC power-based components 104 of the TRU 102 during the power supply mode. In addition, in one or more embodiments, the PCU 120 may include a bi-directional AC-DC converter (operating as the rectifier 120-1 as well as the inverter 120-2) configured to facilitate electrical power exchange between the battery cells 108 and the grid 118 (external power source). The PCU 120 may accordingly facilitate maximizing energy utilization and protection of the battery cells 108 from over-voltage or under-voltage conditions.

Figure 3:
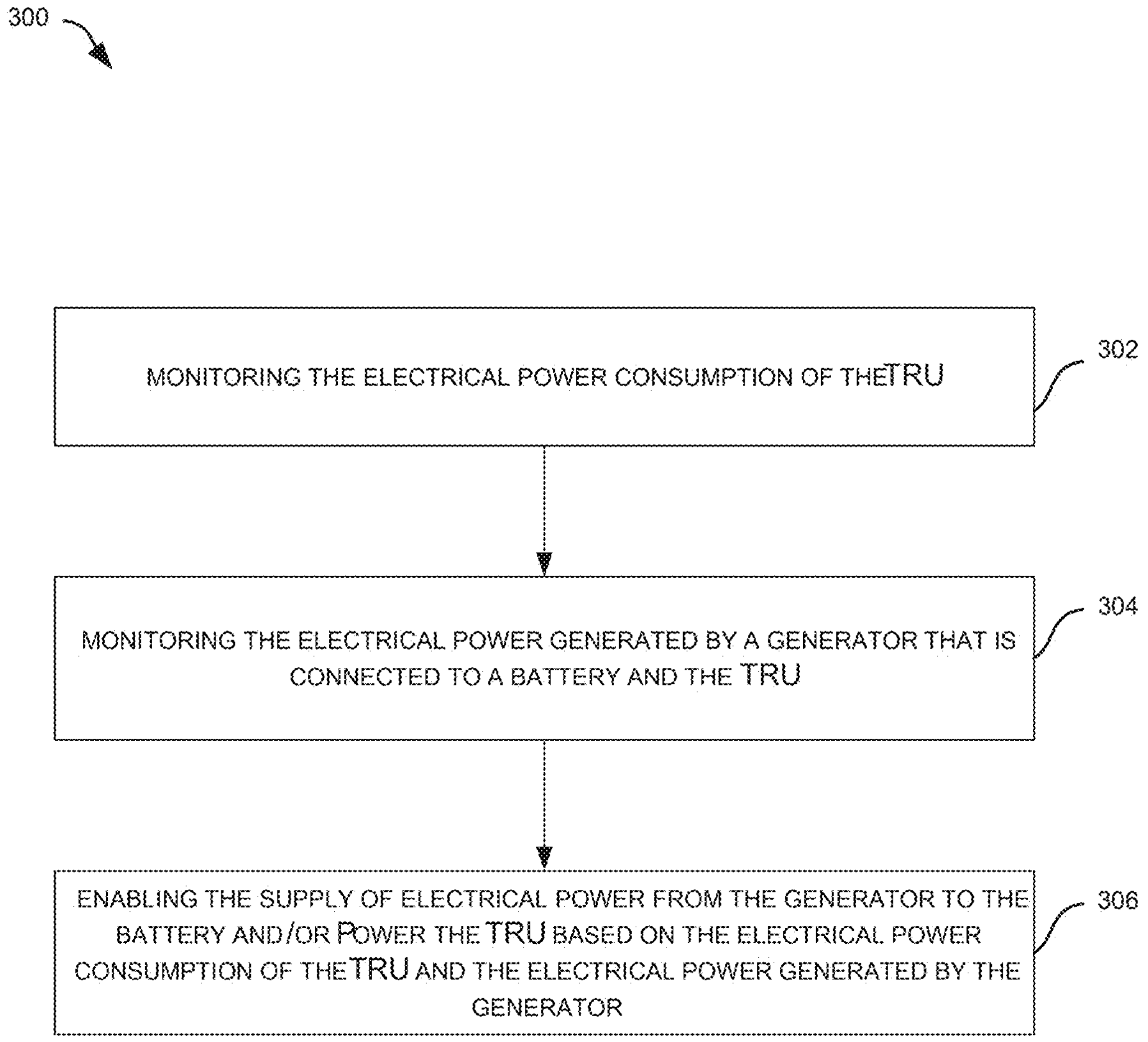
FIG. 3 illustrates exemplary steps involved in a method for power supply management in a transport refrigeration unit, in accordance with one or more embodiments of the subject disclosure.

Referring to FIG. 3, a method 300 for power supply management in a transport refrigeration unit is disclosed. Method 300 may involve the battery 108, the BMS 110, the generator 106, the controller 114/device 200, and other components associated with the system or the TRU 102 of FIGS. 1A and 1B. Method 300 may include step 302 of monitoring the electrical power consumption of the TRU, followed by step 304 of monitoring the electrical power generated by the generator associated with the TRU. The device or sensors may facilitate in monitoring the electrical power consumption of the TRU and the electrical power generated by the generator at steps 302, and 304. Accordingly, method 300 may include step 306 of enabling the supply of electrical power from the generator to the battery and/or powering the TRU based on the electrical power consumption of the TRU and the electrical power generated by the generator.

In one or more embodiments, when the electrical power generated by the generator is determined to be more than the electrical power consumption of the TRU, method 300 may include the step of actuating, by the controller or device, the BMS to enable the supply of the electrical power from the generator to the battery while providing electrical power to the TRU based on its power consumption. As a result, the surplus electrical power available at the generator may be efficiently utilized to charge the battery. This allows the battery to be charged by the generator/engine, while concurrently providing electrical power to the TRU for the operation of the corresponding components.

In one or more embodiments, when the electrical power generated by the generator is determined to be more than the electrical power consumption of the TRU, method 300 may include the step of operating the controller or device in a power supply mode where the controller may actuate the BMS to enable the supply of the electrical power from the generator to the battery. The electrical power supplied by the generator may be determined based on a difference between the electrical power generated by the generator and the electrical power consumption of the TRU, and a current SoC or electrical power stored or available in the battery. This may prevent overcharging or overheating of the battery while charging.

In addition, in one or more embodiments, when the battery is also fully charged and the electrical power generated by the generator is determined to be more than the electrical power consumption of the TRU, method 300 may include the step of operating the controller or device in a power export mode where the controller may actuate the BMS to enable the supply of electrical power from the battery to the grid (external power source), while simultaneously recharging the battery via the generator.

Figure 4:
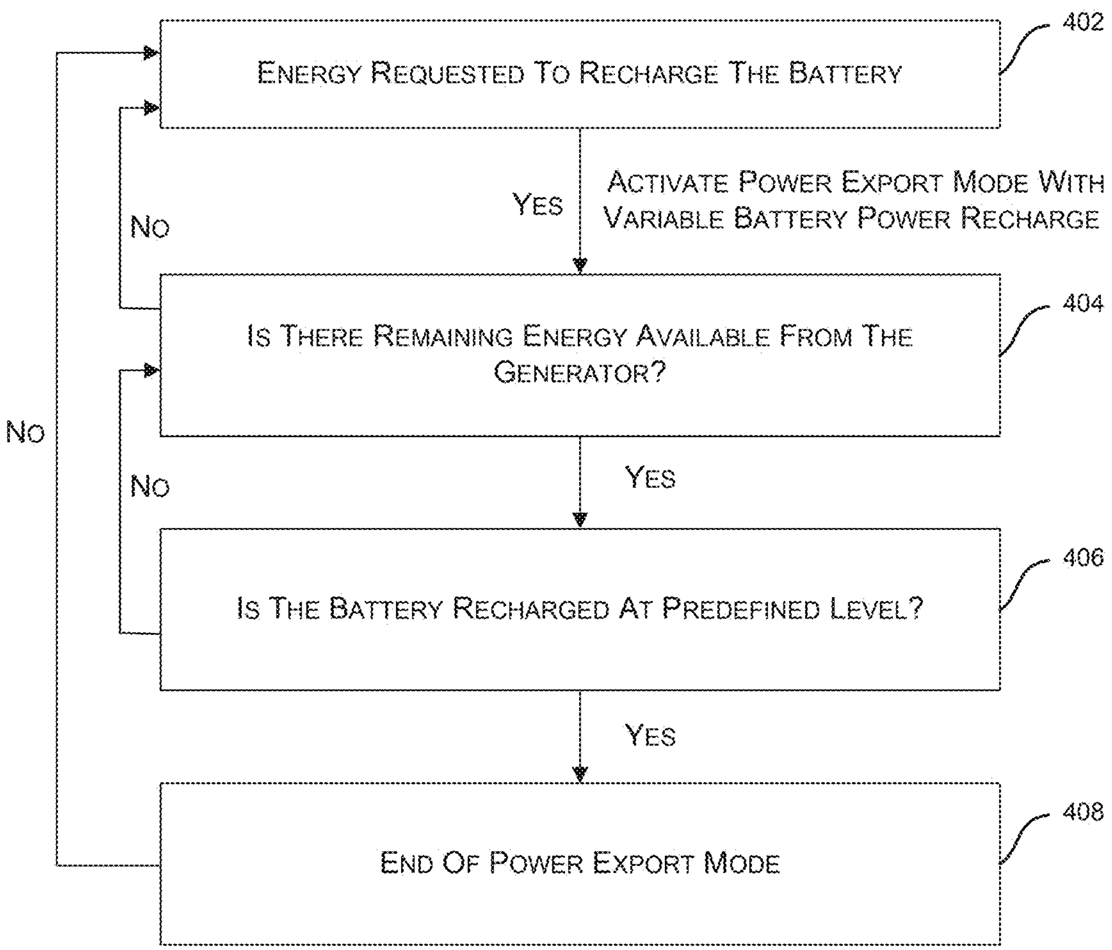
FIG. 4 illustrates a flow chart depicting an exemplary operation executed by the controller, in accordance with one or more embodiments of the subject disclosure

In one or more embodiments, referring to FIG. 4, when a request for recharging the battery is raised at block 402, the controller may check, at block 404, if the electrical power generated by the generator is more than the real-time electrical power consumption of the TRU. Accordingly, if the electrical power generated by the generator is detected to be more than the real-time electrical power consumption of the TRU, the controller may operate in the charging operation mode and actuate the BMS to enable the supply of electrical power from the generator to the battery for recharging the battery. Further, at block 406, the controller may keep monitoring if the battery has been charged above a predefined/threshold level during the power export mode. Accordingly, if the charging level of the battery is detected to reach the predefined/threshold level, the controller may end the charging operation mode at block 408.

Further, in one or more embodiments, when the generator is inactive or when the electrical power generated by the generator is determined to be less than the electrical power consumption of the TRU, method 300 may include the step of operating the controller or device in a power supply mode where the controller may actuate the BMS to enable the supply of the electrical power stored in the battery to the components of the TRU. This may improve the reliability of the system, especially when the generator is inactive or under a fault or maintenance, as the TRU can efficiently and uninterruptedly receive electrical power from the battery in such situations.

Thus, the subject disclosure (system, device, and method) overcomes the shortcomings and limitations associated with the existing diesel-powered reefer units/TRUs and associated power supply management, by providing an improved, cost-effective, efficient, and reliable solution that optimizes the electrical power use in reefer units/TRU, ensuring that the electrical power/energy generated by the generator is effectively utilized for battery recharging without compromising the operation of the refrigeration unit.

The term “real-time” herein refers to the processing of data or the execution of an operation that occurs simultaneously or nearly simultaneously with the event or data acquisition, allowing immediate feedback or action. In the context of the present disclosure, real-time implies that the system or controller can respond to inputs or changes in conditions without perceptible delay, typically within a timeframe determined by the system’s requirements.

While the subject disclosure has been described with reference to exemplary embodiments, it will be understood by those skilled in the art that various changes may be made and equivalents may be substituted for elements thereof without departing from the scope of the subject disclosure as defined by the appended claims. Modifications may be made to adopt a particular situation or material to the teachings of the subject disclosure without departing from the scope thereof. Therefore, it is intended that the subject disclosure not be limited to the particular embodiment disclosed, but that the subject disclosure includes all embodiments falling within the scope of the subject disclosure as defined by the appended claims.

In interpreting the specification, all terms should be interpreted in the broadest possible manner consistent with the context. In particular, the terms “comprises” and “comprising” should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The invention claimed is:

1. A power supply system for a transport refrigeration unit (TRU), the power supply system comprising:
- a battery having a battery management system (BMS), the BMS configured to selectively supply of electrical power to the battery or a supply of electrical power from the battery to the TRU;
- a generator electrically connected to the battery and the TRU, wherein the generator is configured to generate electrical power based on, at least in part, a dedicated engine of the TRU, and wherein the electrical power is distributed either to the TRU, or the battery, or simultaneously to the TRU and the battery; and
- a controller connected to the TRU, the generator, and the BMS, wherein the controller comprises a processor with access to a memory storing instructions executable by the processor, which causes the controller to:
  - monitor electrical power consumption of the TRU;
  - monitor electrical power generated by the generator; and
  - transmit a control signal to the BMS to supply the electrical power from the generator to the battery and/or power the TRU based on the electrical power consumption of the TRU and the electrical power generated by the generator, wherein
- the controller determines whether the electrical power generated by the generator exceeds the electrical power consumption of the TRU and, based on the determination, selectively routes electrical power to the TRU, the battery, or simultaneously to the TRU and the battery.

2. The power supply system of claim 1, wherein the power supply system further comprises:
- a first set of sensors to monitor the electrical power consumed by one or more components of the TRU in real-time; and
- a second set of sensors to monitor the electrical power generated by the generator.

3. The power supply system of claim 1, wherein the controller comprises a charging operation mode in which the controller is configured to actuate one or more switches electrically connected with the BMS to supply the electrical power from the generator to the battery upon detecting the electrical power generated by the generator to be more than the electrical power consumption of the TRU as determined based on a comparison between the monitored electrical power generated and the monitored electrical power consumption.

4. The power supply system of claim 1, wherein the controller is configured to control the BMS based on the electrical power generated by the generator, the electrical power consumption of the TRU, and a state of charge (SoC) of the battery.

5. The power supply system of claim 4, wherein the electrical power supplied by the generator is determined based on a difference between the electrical power consumption of the TRU and the SoC of the battery.

6. The power supply system of claim 1, wherein upon detecting the electrical power generated by the generator to be less than the electrical power consumption of the TRU, the controller is configured to operate in a power supply mode in which the controller actuates one or more switches electrically connected with the BMS to supply the electrical power from the battery to the TRU.

7. The power supply system of claim 1, wherein upon detecting the battery to be charged above a threshold level and the electrical power generated by the generator to be more than the electrical power consumption of the TRU, the controller is configured to operate in a power export mode in which the controller actuates one or more switches electrically connected with the BMS to supply electrical power from the battery to an external power source, while simultaneously recharging the battery via the generator to keep the battery at the threshold level.

8. The power supply system of claim 1, wherein the dedicated engine is a combustion engine that is operable to drive the generator to generate electrical power, wherein the dedicated engine is associated with the TRU or a container equipped with the TRU.

9. The power supply system of claim 1, wherein the system comprises one or more human-machine interfaces (HMI) in communication with the controller, the controller allows one or more users to:
- change between a charging operation mode, a power export mode, and a power import mode; and
- monitor one or more of the real-time electrical power consumption of the TRU, the electrical power generated by the generator, a state of charge (SoC) of the battery, and the electrical power supplied by the generator to the battery.

10. A controller for a transport refrigeration unit (TRU), the controller being connected to the TRU, a battery, a generator, and a battery management system (BMS) of the battery, wherein the controller comprises:
- a processor coupled to a memory storing instructions executable by the processor, which causes the controller to:
  - monitor electrical power consumption of the TRU;
  - monitor electrical power generated by the generator, wherein the generator is configured to generate electrical power based on, at least in part, a dedicated engine of the TRU, and wherein the electrical power is distributed either to the TRU, or the battery, or simultaneously to the TRU and the battery; and
  - transmit a control signal to the BMS to supply of electrical power from the generator to the battery and/or powering the TRU based on the electrical power consumption of the TRU and the electrical power generated by the generator, wherein
- the controller determines whether the electrical power generated by the generator exceeds the electrical power consumption of the TRU and, based on the determination, selectively routes electrical power to the TRU, the battery, or simultaneously to the TRU and the battery.

11. The controller of claim 10, wherein the controller comprises:
- a first set of sensors to monitor the electrical power consumed by one or more components of the TRU in real-time; and
- a second set of sensors to monitor the electrical power generated by the generator.

12. The controller of claim 10, wherein the controller comprises a charging operation mode in which the controller is configured to actuate one or more switches electrically connected with the BMS to the supply the electrical power from the generator to the battery upon detecting the electrical power generated by the generator to be more than the electrical power consumption of the TRU.

13. The controller of claim 12, wherein the controller is configured to controls the BMS based on the electrical power generated by the generator, the electrical power consumption of the TRU, and a state of charge (SoC) of the battery, wherein the electrical power supplied by the generator is determined based on a difference between the electrical power consumption of the TRU and the SoC of the battery.

14. The controller of claim 10, wherein upon detecting the electrical power generated by the generator to be less than the electrical power consumption of the TRU, the controller is configured to operate in a power supply mode in which the controller actuates one or more switches electrically connected with the BMS to supply the electrical power from the battery to the TRU.

15. The controller of claim 10, wherein upon detecting the battery to be charged above a threshold level and the electrical power generated by the generator to be more than the electrical power consumption of the TRU, the controller is configured to operate in a power export mode in which the controller actuates one or more switches electrically connected with the BMS to supply the electrical power from the battery to an external power source, while simultaneously recharging the battery via the generator to keep the battery at the threshold level.

16. The controller of claim 10, wherein the dedicated engine is a combustion engine that is operable to drive the generator to generate electrical power, wherein the dedicated engine is associated with the TRU or a container equipped with the TRU.

17. The controller of claim 10, wherein the controller comprises a communication module operatively coupled to the controller, which enables the controller to establish a secured communication between the controller and one or more human-machine interface (HMI) associated with one or more users, wherein the controller allows one or more users to:

change between a charging operation mode, a power export mode, and a power import mode; and monitor one or more of the real-time electrical power consumption of the TRU, the electrical power generated by the generator, a state of charge (SoC) of the battery, and the electrical power supplied by the generator to the battery.

18. A method for power supply management in a transport refrigeration unit (TRU), the method comprising:

monitoring, by a controller, electrical power consumption of the TRU;

monitoring, by the controller, electrical power generated by a generator that is connected to a battery and the TRU, wherein the generator is configured to generate electrical power based on, at least in part, a dedicated engine of the TRU, and wherein the electrical power is distributed either to the TRU, or the battery, or simultaneously to the TRU and the battery; and transmitting a control signal to a battery management system (BMS) to supply of electrical power from the generator to the battery and/or powering the TRU based on the electrical power consumption of the TRU and the electrical power generated by the generator, wherein the method further comprises determining by the controller whether the electrical power generated by the generator exceeds the electrical power consumption of the TRU and, based on the determination, selectively routes electrical power to the TRU, the battery, or simultaneously to the TRU and the battery.

19. The method of claim 18, wherein when the electrical power generated by the generator is more than the electrical power consumption of the TRU, the method comprises the steps of transmitting the control signals to the BMS associated with the battery to supply the electrical power from the generator to the battery, and wherein the electrical power supplied by the generator is determined based on the electrical power generated by the generator, the electrical power consumption of the TRU, and a state of charge (SoC) of the battery.

20. The method of claim 18, wherein when the electrical power generated by the generator is less than the electrical power consumption of the TRU, the method comprises the steps of transmitting the control signals to the BMS associated with the battery to enable the supply of the electrical power stored in the battery to the TRU.

* * * * *